United States Patent [19]

Nakayama et al.

[11] E Re. 28,886

[45] Reissued June 29, 1976

[54] METHOD FOR PREPARING CYTIDINE DIPHOSPHATE CHOLINE

[75] Inventors: Kiyoshi Nakayama, Sagamihara; Hiroshi Hagino, Tokyo, both of Japan

[73] Assignee: Kyowa Hakko Kogyo Co., Ltd., Tokyo, Japan

[22] Filed: June 4, 1973

[21] Appl. No.: 366,263

Related U.S. Patent Documents

Reissue of:

[64] Patent No.: 3,684,652
Issued: Aug. 15, 1972
Appl. No.: 60,743
Filed: Aug. 3, 1970

[30] Foreign Application Priority Data

Aug. 4, 1969 Japan ..... 44-60999

[52] U.S. Cl. ..... 195/28 N
[51] Int. Cl.[2] ..... C12D 13/06
[58] Field of Search ..... 195/28 N

[56] References Cited

OTHER PUBLICATIONS

Borkenhagen et al., The Journal of Biological Chemistry, vol. 227, pp. 951–962, (1957).

The Handbook of Enzymes, Asakura Shoten, pp. 374 & 375, (1965).

*Primary Examiner*—Alvin E. Tanenholtz
*Attorney, Agent, or Firm*—Fitzpatrick, Cella, Harper & Scinto

[57] ABSTRACT

Cytidine diphosphate choline is prepared by culturing an aqueous reaction liquor containing (a) at least one of the class consisting of choline or phosphoryl choline; (b) at least one of the class consisting of cytidine, cytidine-5′-monophosphate, cytidine-5′-diphosphate or cytidine-5′triphosphate; (c) enzyme systems of bacteria, yeasts or molds; (d) phosphate ion and (e) at least one of the class consisting of magnesium ion and manganese ion and recovering cytidine diphosphate choline from said culturing liquor.

13 Claims, No Drawings

METHOD FOR PREPARING CYTIDINE DIPHOSPHATE CHOLINE

Matter enclosed in heavy brackets [ ] appears in the original patent but forms no part of this reissue specification; matter printed in italics indicates the additions made by reissue.

This invention relates to a method for preparing a high purity cytidine diphosphate choline having utility as a biochemical reagent, a medicinal preparation for treatment on head injury and the like. An object of the present invention is to produce cytidine diphosphate choline by a fermentation process efficiently and economically in good yield, at low cost and on an industrial scale.

As is known, cytidine diphosphate choline is a coenzyme relating to a lipid metabolism of living bodies. This compound can be represented according to the following structural formula:

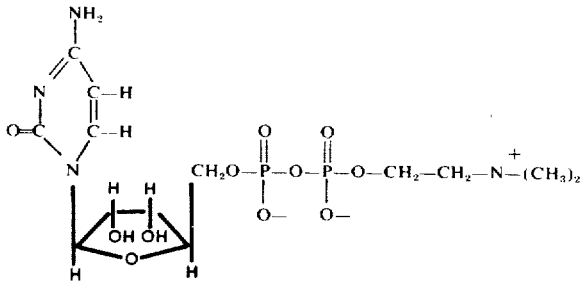

Recently, it has been disclosed that cytidine diphosphate choline can be separated from yeast (Science vol. 124, p. 81 (1956)) or prepared according to a synthetic method (Journal of Biological Chemistry vol. 222, pp. 185–191 (1956)). However, cytidine diphosphate choline is difficult to produce on a commercial scale since the yields obtainable with present methods of production are unacceptably low leading to high production costs which may prove prohibitive. Accordingly, despite its valuable utility, cytidine diphosphate choline presently has little significance as a practical matter. Thus, the importance of providing a method for producing a purified preparate of cytidine diphosphate choline in good yield at low cost and capable of implementation on an industrial scale is clear.

In accordance with the present invention there is provided a method adapted for use on an industrial scale for producing cytidine diphosphate choline in good yield at low cost which comprises culturing an aqueous reaction liquor i.e., nutrient medium, containing (a) at least one of the class consisting of choline or phosphorylcholine (b) at least one of the class consisting of cytidine, cytidine-5′-monophosphate (hereinafter referred to as "CMP"), cytidine-5′-diphosphate (hereinafter referred to as "CDP") and cytidine-5′-triphosphate (hereinafter referred to as "CTP"); (c) enzymes of at least one of the class consisting of yeast, bacteria including Actinomycetes and molds; (d) phosphate ion and (e) at least one of the class consisting of magnesium ion and manganese ion. The culturing treatment can be carried out under atmospheric pressure and normal temperature with conventional equipment.

The starting raw materials, cytidine, CMP, CDP, or CTP are known commercially available compounds and can be prepared according to synthetic methods. In addition, cytidine or CMP may be prepared by enzymatic decomposition of ribonucleic acid. CDP or CTP can also be prepared by phosphation of CMP. Any of such materials can be used herein either in the free form or nontoxic i.e., pharmaceutically acceptable salt forms such as the sodium salt, barium salt, etc.

Choline is produced on an industrial scale and is readily available commercially. This material can be used in the form of its pharmaceutically acceptable salts, e.g., chloride bromide, citrates, gluconates, etc. Phosphorylcholine can be prepared by phosphation of choline chloride, and is commercially available in the form of the chloride and salt of chloride, like choline. Any of the aforementioned forms can be used herein. In addition, functional derivatives that serve as substitutes for choline and phosphorylcholine can also be used.

The concentration of the choline, CMP, CDP, CTP, cytidine or phosphorylcholine is not particularly critical apart from the requirement that it be present in effective amounts, i.e., amounts enabling the production of the quantity of product cytidine diphosphate choline desired. In general, it is recommended to use the cytidine CMP, CDP and/or CTP in amounts ranging from about 1 g./l. to 1,000 g./l., as a free acid concentration with a concentration of 5 g./l. to 30 g./l. being preferred. The choline and/or phosphorylcholine is preferably employed in a concentration ranging from 0.5 g./l. to 50 g./l.

The phosphate ion requirements may be supplied by the addition of inorganic phosphates such as $KH_2PO_4$, $K_2HPO_4$, $K_3PO_4$, $Na_2HPO$, $NaH_2PO_4$, and $Na_3PO_4$ and the like, or alternatively, by the addition of the free acid, e.g., phosphoric acid, which can then be neutralized with suitable alkali such as NaOH, KOH, $NH_4OH$, or the like, i.e., in situ formation of the phosphate. In certain instances, e.g., when CTP and phosphorylcholine are used, it is not necessary to add phosphate ion thereto as a separate additive, the requisite phosphate ion being supplied by the CTP or phosphorylcholine.

The phosphate ion concentration is also not particularly critical and may vary over a wide range depending upon the requirements of the processor. In any event, for optimum results it is recommended that the aqueous culturing medium contain from 2 g./l. to 200 g./l. of phosphate ion as $PO_4$ with a concentration of 10 g./l. to 40 g./l. being preferred.

The concentration of the magnesium ion and/or manganese ion preferably supplied in the form of inorganic salts, e.g., magnesium sulfate, manganese sulfate, etc., is preferably within the range of 0.001 g./l. to 3 g./l. In those instances where the enzyme is not provided in a purified state, the magnesium or manganese are supplied together with the enzyme preparate i.e., without any special addition.

In any event, it will be understood that the aforedescribed ranges are given only by way of defining preferred modes of proceeding and thus, departures therefrom may be recommended in a particular instance.

The yeast, bacteria and/or mold useful herein are provided in a form such that enzyme systems of the yeast, bacteria and/or mold cells can be readily liberated into the aqueous liquor under the conditions employed for culturing. Suitable yeast, bacteria or mold specimens may be prepared by drying, plasmolysis, treatment with a solvent such as acetone or the like, extraction, surfactant treatment, sonic or other treatment. Preferably, yeast, bacteria or mold cell bodies obtained as by-products in industrial fermentation and subjected to acetone-drying treatment, are recommended for use. Extract liquor obtained by treating yeast, bacteria or molds according to a mechanical rupture, sonic treatment, bacteriolysis enzyme treatment, etc., can of course also be used. Various kinds of bacteria, molds and yeasts can be used in the present invention with specific representatives, including without necessary limitation, the following:

Brevibacterium ammoniagenes ATCC 6872
Escherichia coli ATCC 21148
Serratia marcesens ATCC 2123
Aerobacter aerogenes ATCC 21217
Corynebacterium glutamicum ATCC 13287
Arthrobacter simplex ATCC 15799
Micrococcus sodonensis ATCC 11880
Pseudomonas fluorescens ATCC 21256
Bacillus subtilis ATCC 15512
Nocardia globerula ATCC 21022
Streptomyces ambofaciens ATCC 15154
Penicillium chrysogenum ATCC 15241
Aspergillus terreus ATCC 1012
Aspergillus flavus ATCC 13698
Gibberella fujikuroi ATCC 20136
Rhizopus delemar ATCC 20134
Mucor javanicus ATCC 15242
Saccharomyces cereviside ATCC 15248
Saccharomyces lactis ATCC 12425
Torulopsis sphaerica ATCC 8549
Zygosaccharomyces major (synonym, Saccharomyces rouxii) ATCC 15249
Kloecker africana ATCC 16512
Candida guilliermondii ATCC 9058

In accordance with a particularly preferred embodiment, there is added to the aqueous reaction liquor at least one fermentable sugar such as glucose, fructose, sucrose, maltose, etc. This enables the production of even greater yields of cytidine diphosphate choline. The fermentable sugar is preferably employed in a concentration ranging from about 5 g./l.–100 g./l. of aqueous reaction liquor.

After the reaction liquor is prepared by mixing the aforedescribed components, the pH is adjusted to a value of 5.0–9.0, preferably 7.0–7.2 with suitable acid or alkali. Culturing may be carried out at normal or slightly elevated temperatures, e.g., from 20°–55° C. until a substantial amount of cytidine diphosphate choline is formed. The culturing time depends upon the culturing temperature and pH, but generally requires about 0.5 to 10 hours. Formation of cytidine diphosphate choline can be traced according to thin layer chromatography, or other suitable analytical method.

After the completion of culturing, the bacteria, molds or solid matters are removed from the culturing liquor, and then cytidine diphosphate choline is separated and recovered according to the well known procedure using an ion exchange resin as will explained in detail in the examples which follow.

The followig examples are given for purposes of illustration only and are not to be considered as necessarily constituting a limitation on the invention.

Example 1

A 250 ml. conical flask containing 30 ml. of a reaction liquor (pH 7.0) having a composition of 7.38 mg./ml. of disodium salt of CMP, 24 mg./ml. of choline, 10 mg./ml. of glucose, 100 mg./ml. of acetone-dried cells of Brevibacterium ammoniagenes ATCC 6872, 11.6 mg./ml. of monopotassium phosphate, 20 mg./ml. of dipotassium phosphate and 2.96 mg/ml. of magnesium sulfate ($MgSO_4.7H_2O$)

was subjected to culturing at 30° C. for 4 hours. Cytidine diphosphate choline was formed and accumulated at a concentration of 3.8 mg./ml. in the culture liquor.

The pH of 1.2 l. of filtrate containing 3.8 mg./ml. of cytidine diphosphate choline, obtained by removing solid matters from the culturing liquor, was adjusted to a pH of 8.5 with a 0.5 N KOH solution. The filtrate was passed through a column of strongly basic anion exchange resin, Dowex 1 × 2 (formic acid type). After washing the resin with water, a formic acid solution was passed through the column with gradual increase in the concentration of formic acid (until 0.04 N max.). A fraction of cytidine diphosphate choline was collected by elution according to the so-called gradient elution method and absorbed onto carbon powders. Then, elution was effected with acetone, and the eluate was concentrated and dried. 1.3 g. of cytidine diphosphate choline powders were obtained.

Example 2

Example 1 was repeated except that the glucose was omitted. 0.3 mg./ml. of cytidine diphosphate choline was obtained. When the culturing was carried out in the reaction liquor further omitting disodium salt of CMP which was substrate and choline, no cytidine diphosphate choline was detected (less than 0.05 mg./ml.).

Example 3

Example 1 was repeated except that 4 mg./ml. of cytidine was used in place of the disodium salt of CMP of Example 1. 0.5–0.6 mg./ml. of cytidine diphosphate choline was obtained.

Examples 4–19

Example 1 was repeated except that acetone dried cell bodies of the species shown in Table 1 were used in place of the cell bodies of Brevibacterium ammoniagenes of Example 1. The results obtained are as follows.

TABLE I

| Ex. number | Strains | Amount[1] (mg./ml.) |
|---|---|---|
| 4 | Escherichia coli ATCC 21148 | 2.5 |
| 5 | Serratia marcescens ATCC 21213 | 0.7 |
| 6 | Aerobacter aerogenes ATCC 21217 | 0.6 |
| 7 | Corynebacterium glutamicum ATCC 13287 | 0.9 |
| 8 | Arthrobacter simplex ATCC 15799 | 0.7 |
| 9 | Micrococcus sodonensis ATCC 11880 | 0.5 |
| 10 | Pseudomonas fluorescens ATCC 21256 | 0.7 |
| 11 | Bacillus subtilis ATCC 15512 | 0.6 |
| 12 | Nocardia globerula ATCC 21022 | 0.8 |
| 13 | Streptomyces ambofaciens ATCC 15154 | 0.8 |
| 14 | Penicillium chrysogenum ATCC 15241 | 0.9 |
| 15 | Aspergillus terreus ATCC 1012 | 0.6 |
| 16 | Aspergillus flavus ATCC 13698 | 0.5 |
| 17 | Gibberella fujikuroi ATCC 20136 | 1.2 |
| 18 | Rhizopus delemar ATCC 20134 | 0.5 |
| 19 | Mucor javanicus ATCC 15242 | 0.5 |

[1]Cytidine diphosphate choline, formed.

Example 20

Example 1 was repeated except that 8.1 mg./ml. of CDP was used in place of the disodium salt of CMP of Example 1. 4.1 mg./ml. of cytidine diphosphate choline was obtained.

Example 21

Example 1 was repeated except that 9.7 mg./ml. of CTP was used in place of the disodium salt of CMP of Example 1. 4.1 mg./ml. of cytidine diphosphate choline was obtained.

Examples 22–37

Cytidine diphosphate choline was formed in amounts almost equal to those of Examples 4–19 with each of the strains described therein when culturing was carried out in 5 ml. of reaction liquor in a test tube with shaking in the manner similar to that described in Example 4–19, except that 8.1 mg./ml. of CDP or 9.7 mg./ml. of CTP was used in place of CMP.

Example 38

A 250 ml. conical flask containing 30 ml. of a reaction liquor (pH 7.0) having a composition of 8.1 mg./ml. of CDP, 24 mg./ml. of choline, 10 mg./ml. of glucose, 100 mg/ml. of dried baker's yeast, 11.6 mg./ml. of monopotassium phosphate, 20 mg./ml. of dipotassium phosphate and 2.96 mg./ml. of $MgSO_4.2H_2O$ was subjected to culturing at 30° C. for 4 hours. Cytidine diphosphate choline was formed and accumulated at a concentration of 4.2 mg./ml. in the culture liquor.

The pH of 1.2 l. of the filtrate containing 4.2 mg./ml. of cytidine diphosphate choline obtained by removing solid matters from the culturing liquor, was adjusted to a pH of 8.5 with a 0.5 N KOH solution. The filtrate was passed through a column of strongly basic anion exchange resin, Dowex 1 × 2 (formic acid type). After washing the resin with water, a formic acid solution was passed through the column with gradual increase in the concentration of formic acid (until 0.04 N max.). A fraction of cytidine diphosphate choline was collected by elution according to the so-called gradient elution method and absorbed onto carbon powders. Then, elution was effected with acetone, and eluate was concentrated and dried. 1.8 g. of cytidine diphosphate choline powders were obtained.

Example 39

Example 38 was repeated except that the glucose was omitted. 0.4 mg./ml. of cytidine diphosphate was obtained. When the culturing was carried out in the reaction liquor further free from CDP and choline, no cytidine diphosphate choline was detected (less than 0.05 mg./ml.).

Example 40

Example 38 was repeated except that 9.7 mg./ml. of CTP was used in place of the CDP of Example 38. 4.3 mg./ml. of cytidine diphosphate choline was obtained.

Examples 41–46

Example 38 was repeated except that acetone dried cell bodies of the species shown in Table 2 were used in place of the dried baker's yeast of Example 38. The results obtained are as follows:

TABLE II

| Ex. number | Strains | Amount[1] (mg./ml.) |
|---|---|---|
| 41 | Saccharomyces cerevisiae ATCC 15248 | 3.7 |
| 42 | Saccharomyces lactis ATCC 12425 | 2.3 |
| 43 | Torulopsis sphaerica ATCC 8549 | 2.8 |
| 44 | Zygosaccharomyces major (synonym, Saccharomyces rouxii) ATCC 15249. | 2.1 |
| 45 | Kloeckera africana ATCC 16512 | 1.2 |
| 46 | Candida guilliermondii ATCC 9058 | 1.1 |

[1]Cytidine diphosphate choline, formed.

Examples 47–52

Examples 41–46 were repeated except the 9.7 mg./ml. of CTP were used in place of CDP of Examples 41–46. The results are as follows:

TABLE III

| Ex. number | Strains | Amount[1] (mg./ml.) |
|---|---|---|
| 47 | Saccharomyces cerevisiae ATCC 15248 | 3.6 |
| 48 | Saccharomyces lactis ATCC 12425 | 3.3 |
| 49 | Torulopsis sphaerica ATCC 8549 | 3.1 |
| 50 | Zygosaccharomyces major ATCC 15249 (synonym, Saccharomyces rouxii). | 1.7 |
| 51 | Kloeckera africana ATCC 16512 | 1.2 |
| 52 | Candida guilliermondii ATCC 9058 | 1.3 |

[1]Cytidine diphosphate choline, formed.

Example 53

A 250 ml. conical flask containing 30 ml. of a reaction liquor (pH 7.0) having a composition of 7.38 mg./ml. of disodium salt of CMP, 24 mg./ml. of choline, 10 mg./ml. of glucose, 100 mg./ml. of dried baker's yeast, 11.6 mg./ml. of monopotassium phosphate, 20 mg./ml. of dipotassium phosphate, 2.96 mg./ml. of $MgSO_4.2H_2O$ was subjected to culturing at 30° C. for 4 hours. Cytidine diphosphate choline was formed and accumulated at a concentration of 4.0 mg./ml. in the culture liquor.

The pH of 1.2 l. of filtrate containing 4.0 mg./ml. of cytidine diphosphate choline obtained by removing solid matters from the culture liquor, was adjusted to pH of 8.5 with a 0.5 N KOH solution. The filtrate was passed through a column of strongly basic anion exchange resin, Dowex 1 × 2 (formic acid type). After washing the resin with water a formic acid solution was passed through the column with gradual increase in the concentration of formic acid (until 0.04 N max.). A fraction of cytidine diphosphate choline was collected by elution according to the so-called gradient elution method, and absorbed onto carbon powders. Then, elution was effected with acetone, and the eluate was concentrated and dried. 1.8 g. of cytidine diphosphate choline powders was obtained.

Example 54

Example 53 was repeated except that the glucose was omitted. 0.4 mg./ml. of cytidine diphosphate choline was obtained. When culturing was carried out in the reaction liquor further omitting CMP and choline, no cytidine diphosphate choline was detected. (less than 0.05 mg./ml.)

Examples 55–60

Example 53 was repeated except that acetone dried cell bodies of the species shown in Table IV were used in place of the dried baker's yeast of Example 53. The results obtained are as follows:

TABLE IV

| Ex. number | Strains | Amount[1] (mg./ml.) |
|---|---|---|
| 55 | Saccharomyces cereuisiae ATCC 15248 | 3.6 |
| 56 | Saccharomyces lactis ATCC 12425 | 2.2 |
| 57 | Torulopsis sphaerica ATCC 8549 | 2.8 |
| 58 | Zygosaccharomyces major ATCC 15249 (synonym, Saccharomyces rouxii). | 2.1 |
| 59 | Kloeckera africana ATCC 16512 | 1.3 |
| 60 | Candida guilliermondii ATCC 9058 | 1.1 |

[1]Cytidine diphosphate choline, formed

Example 61

A 250 ml. conical flask containing 30 ml. of a reaction liquor (pH 7.0) having a composition of 7.38 mg./ml. of disodium salt of CMP, 72.4 mg./ml. of phosphorylcholine, 10 mg./ml. of glucose, 100 mg./ml. of dried baker's yeast, 11.6 mg./ml. of monopotassium phosphate, 20 mg./ml. of dipotassium phosphate, 2.96 mg./ml. of $MgSO_4.2H_2O$ was subjected to culturing at 30° C. for 4 hours. Cytidine diphosphate choline was formed and accumulated at a concentration of 3.8 mg./ml. in the culture liquor.

The pH of 1.2 l. of filtrate containing 3.8 mg./ml. of cytidine diphosphate choline obtained by removing solid matters from the culture liquor, was adjusted to pH of 8.5 with a 0.5 N KOH solution. The filtrate was passed through a column of strongly basic anion exchange resin, Dowex 1 × 2 (formic acid type). After washing the resin with water a formic acid solution was passed through the column with gradual increase in the concentration of formic acid (until 0.04 N max.). A fraction of cytidine diphosphate choline was collected by elution according to the so-called gradient elution method, and absorbed onto carbon powders. Then, elution was effected with acetone, and the eluate was concentrated and dried. 1.7 g. of cytidine diphosphate choline powders was obtainded.

What is claimed is:

[1. A method for preparing cytidine diphosphate choline, which comprises culturing an aqueous reaction liquor containing (a) at least one of the class consisting of choline of phosphoryl choline; (b) at least one of the class consisting of cytidine, cytidine-5'-monophosphate, cytidine-5'-diphosphate and cytidine-5'-triphosphate; (c) cells of bacteria yeasts or molds that are in a form which liberate their enzyme systems into the aqueous reaction liquor under the culturing conditions; (d) phosphate ion (e) at least one of the class consisting of magnesium ion and manganese ion (f) at least one fermentable sugar and recovering cytidine diphosphate choline from said culturing liquor. ]

2. A method according to claim [1] *14* wherein said culturing is carried out at a temperature of from about 20° C. to 55° C.

3. A method according to claim [1] *14* wherein the pH of said aqueous reaction liquor is from about 5.0 to 9.0.

4. A method according to claim [1] *14* wherein (a) comprises choline and (b) comprises cytidine-5'-monophosphate.

5. A method according to claim [1] *14* wherein (a) comprises choline and (b) comprises cytidine.

6. A method according to claim [1] *14* wherein (a) comprises choline and (b) comprises cytidine-5'-diphosphate.

7. A method according to claim [1] *14* wherein (a) comprises choline and (b) comprises cytidine-5'-triphosphate.

8. A method according to claim [1] *14* wherein said phosphate ion is supplied by a mixture of monopotassium phosphate and dipotassium phosphate.

9. A method according to claim [1] *14* (e) comprises magnesium sulfate.

10. A method according to claim [1] *14* wherein said fermentable sugar comprises glucose.

11. A method according to claim [1] *14* wherein recovery of said cytidine diphosphate choline is effected by passing a filtrate containing the cytidine diphosphate choline obtained from the aqueous reaction liquor through an ion exchange resin column.

12. A method according to claim [1] *14* wherein (c) is at least one member of the class consisting of:

Brevibacterium ammoniagenes ATCC 6872
Escherichia coli ATCC 21148
Serratia mercescens ATCC 2123
Aerobacter aerogenes ATCC 21217
Corynebacterium glutamicum ATCC 13287
Arthrobacter simplex ATCC 15799
Micrococcus sodonensis ATCC 11880
Pseudomonas fluorescens ATCC 21256
Bacillus subtilis ATCC 15512
Nocardia globerula ATCC 21022
Streptomyces ambofaciens ATCC 15154
Penicillium chrysogenum ATCC 15241
Aspergillus terreus ATCC 1012
Aspergillus flavus ATCC 13698
Gibberella fujikuroi ATCC 20136
Rhizopus delemar ATCC 20134
Mucor javanicus ATCC 15242
[ Saccharomyces cerevisiae ATCC 15248
Saccharomyces lactis ATCC 12425
Torulopsis sphaerica ATCC 8549
Zygosaccharomyces major (synonym Saccharomyces rouxii) ATCC 15249
Kloeckera africana ATCC 16512
Candida guilliermondii ATCC 9058]

13. A method according to claim [1] *14* wherein said fermentable sugar is present in a concentration from about 5 g./l. to 100 g./l. of said reaction liquor.

*14. A method for preparing cytidine diphosphate choline which comprises culturing an aqueous reaction li-*

*quor containing (a) at least one of the class consisting of choline and phosphoryl choline; (b) at least one of the class consisting of cytidine, cytidine-5'-monophosphate, cytidine-5'-diphosphate and cytidine-5'-triphosphate; (c) cells of bacteria or molds that are in a form which liberate their enzyme systems into the aqueous reaction liquor under the culturing conditions; (d) phosphate ion (e) at least one of the class consisting of magnesium ion and manganese ion; (f) at least one fermentable sugar and recovering cytidine diphosphate choline from said culture liquor.*

* * * * *

UNITED STATES PATENT OFFICE
CERTIFICATE OF CORRECTION

Patent No. Re 28,886 Dated June 29, 1976

Inventor(s) Kiyoshi Nakayama and Hiroshi Hagino

It is certified that error appears in the above-identified patent and that said Letters Patent are hereby corrected as shown below:

Column 1, lines 22 to 35 the formula should read as follows:

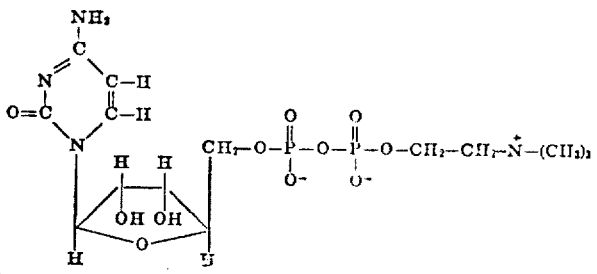

Signed and Sealed this

Twenty-eighth Day of September 1976

[SEAL]

*Attest:*

RUTH C. MASON
*Attesting Officer*

C. MARSHALL DANN
*Commissioner of Patents and Trademarks*